United States Patent [19]

Wisecarver et al.

[11] Patent Number: 4,848,870
[45] Date of Patent: Jul. 18, 1989

[54] OPTICAL FIBER JAW CONNECTOR

[75] Inventors: Martin L. Wisecarver, Sonora; Abdul Tayeb, San Leandro, both of Calif.

[73] Assignee: Raychem Corporation, Menlo Park, Calif.

[21] Appl. No.: 178,115

[22] Filed: Apr. 6, 1988

[51] Int. Cl.$^4$ .............................................. G02B 6/38
[52] U.S. Cl. ............................. 350/96.21; 350/96.20
[58] Field of Search ............... 350/96.20, 96.21, 96.22, 350/96.15

[56] References Cited

U.S. PATENT DOCUMENTS

| | | | |
|---|---|---|---|
| 4,047,796 | 9/1977 | Kao et al. | 350/96.21 |
| 4,155,624 | 5/1979 | Logan et al. | 350/96.21 |
| 4,253,730 | 3/1981 | Logan et al. | 350/96.21 |
| 4,320,938 | 3/1982 | Gunnersen et al. | 350/96.21 |
| 4,354,731 | 10/1982 | Mouissie | 350/96.21 |
| 4,421,382 | 12/1983 | Doi et al. | 350/96.20 |
| 4,607,911 | 8/1986 | Rhodes | 350/96.20 |
| 4,639,077 | 1/1987 | Dobler | 350/96.20 |
| 4,645,296 | 2/1987 | Cattin et al. | 350/96.21 |
| 4,668,045 | 5/1987 | Melman et al. | 350/96.21 |
| 4,679,895 | 7/1987 | Huber | 350/96.20 |
| 4,696,537 | 9/1987 | Bauer et al. | 350/96.20 |
| 4,728,171 | 3/1988 | Schofield et al. | 350/96.20 |

FOREIGN PATENT DOCUMENTS 2616876  10/1977  Fed. Rep. of Germany ... 350/96.20

*Primary Examiner*—William L. Sikes
*Assistant Examiner*—Brian M. Healy
*Attorney, Agent, or Firm*—A. Stephen Zavell; Herbert G. Burkard

[57] ABSTRACT

An optical fiber connector includes fiber end aligning jaws which have pyramid shaped entrances which are keyed to pyramid shaped collets for keeping the jaws in an expanding attitude to allow for easy fiber insertion into the jaws. Subsequent to fiber insertion, a fiber contact is locked to the connector so as to simultaneously release its corresponding collet an amount sufficient so that the jaws are urged into aligning contact with the fiber.

19 Claims, 8 Drawing Sheets

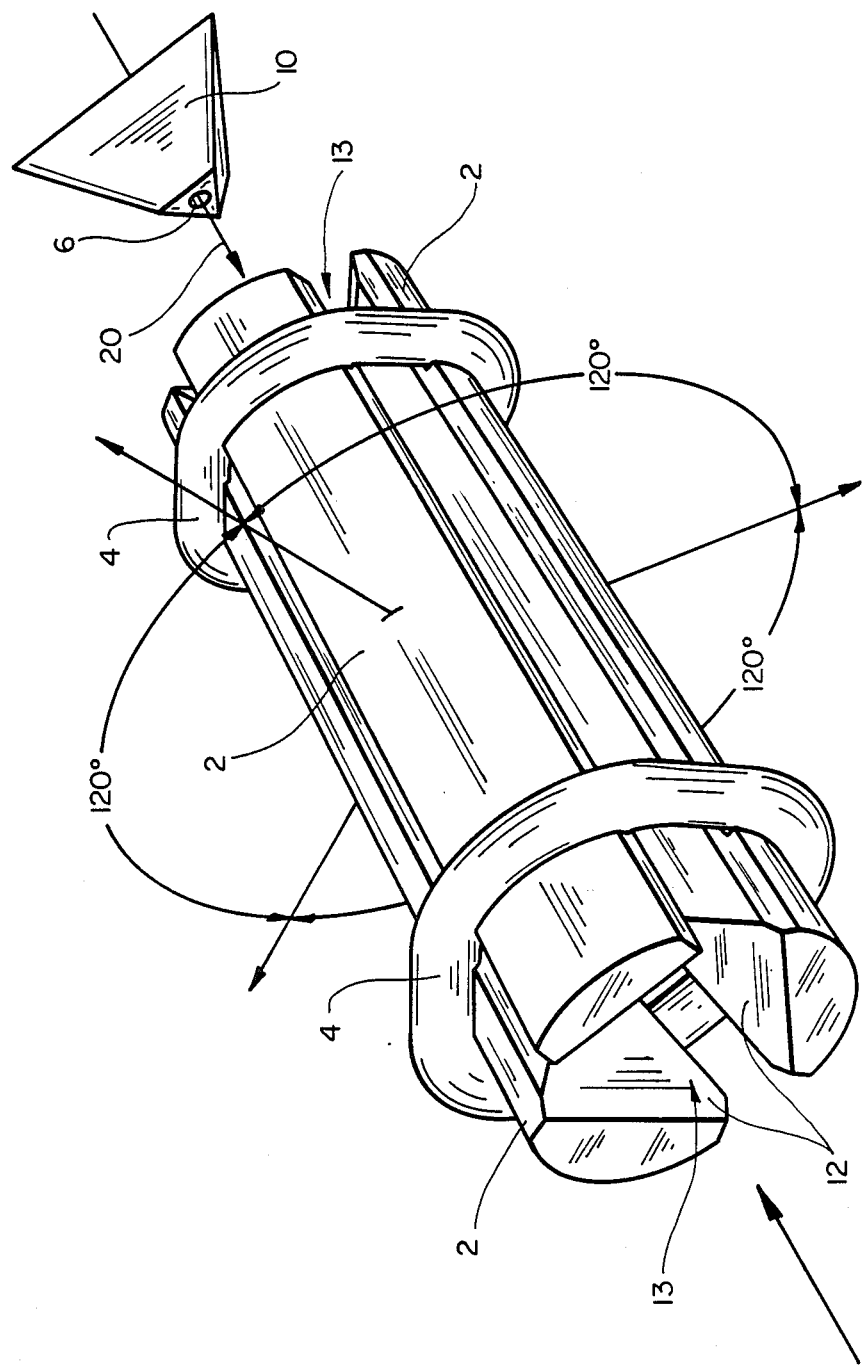
FIG_1

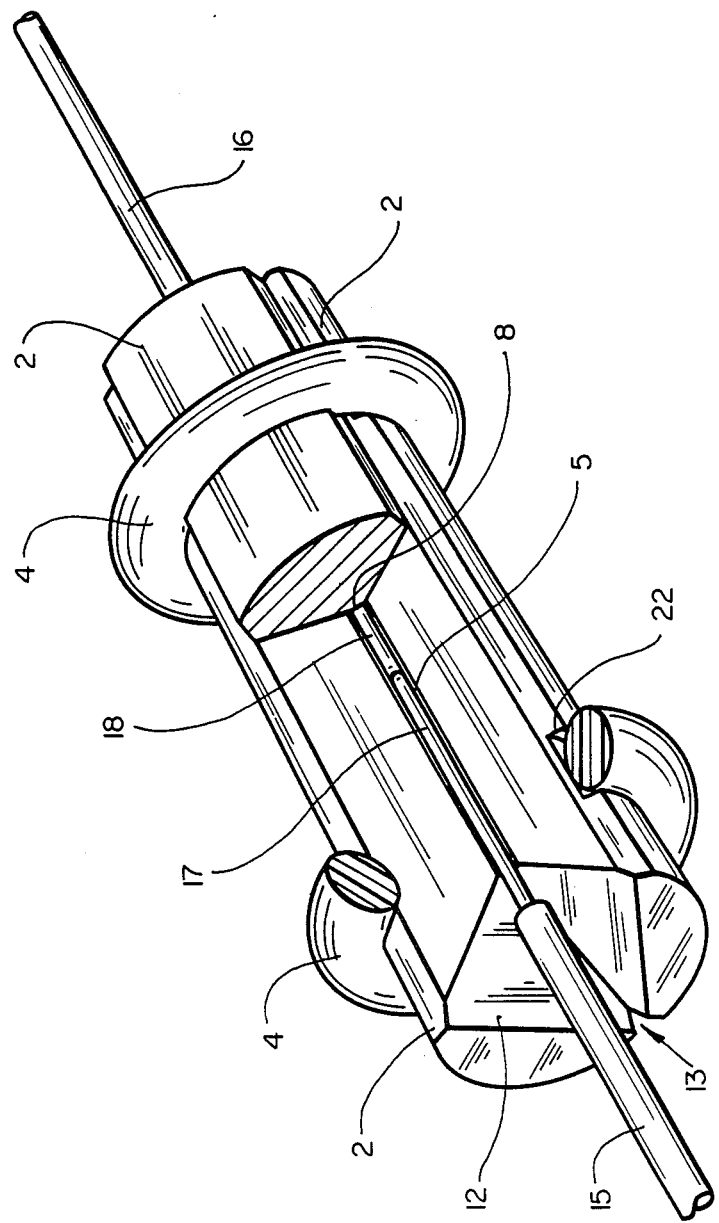
FIG_2

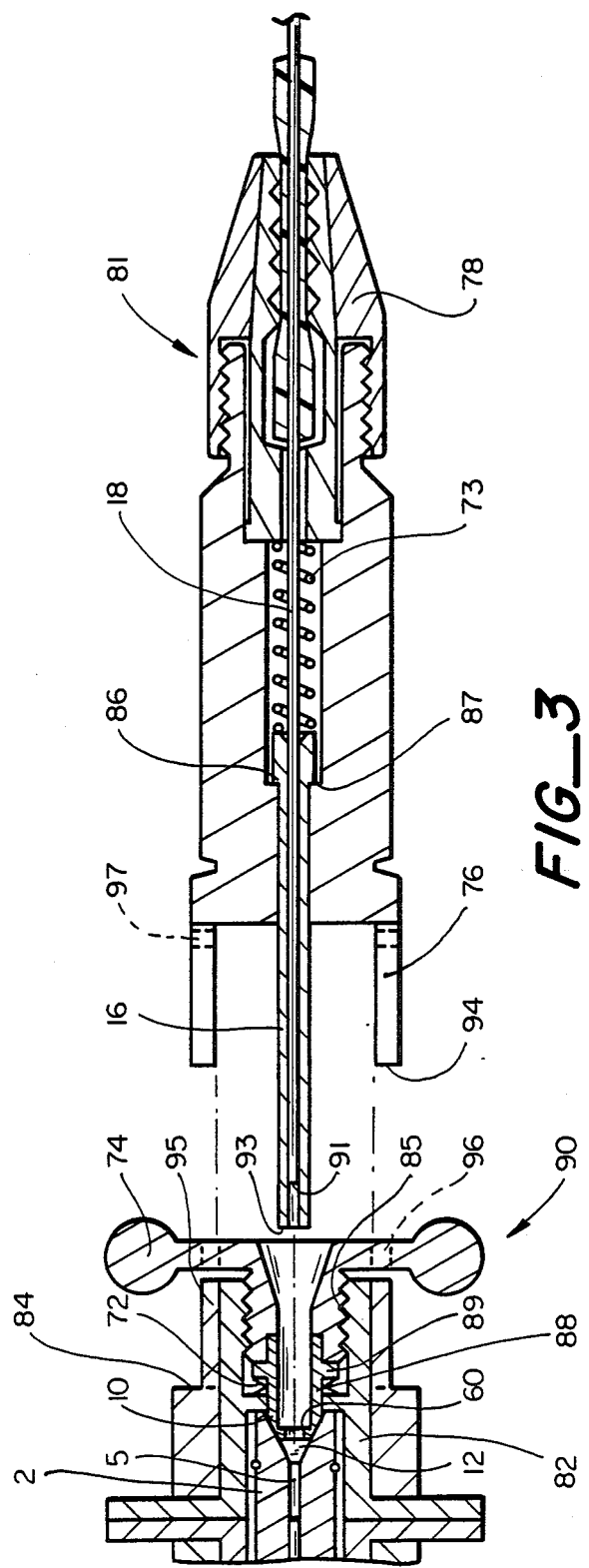
FIG_3

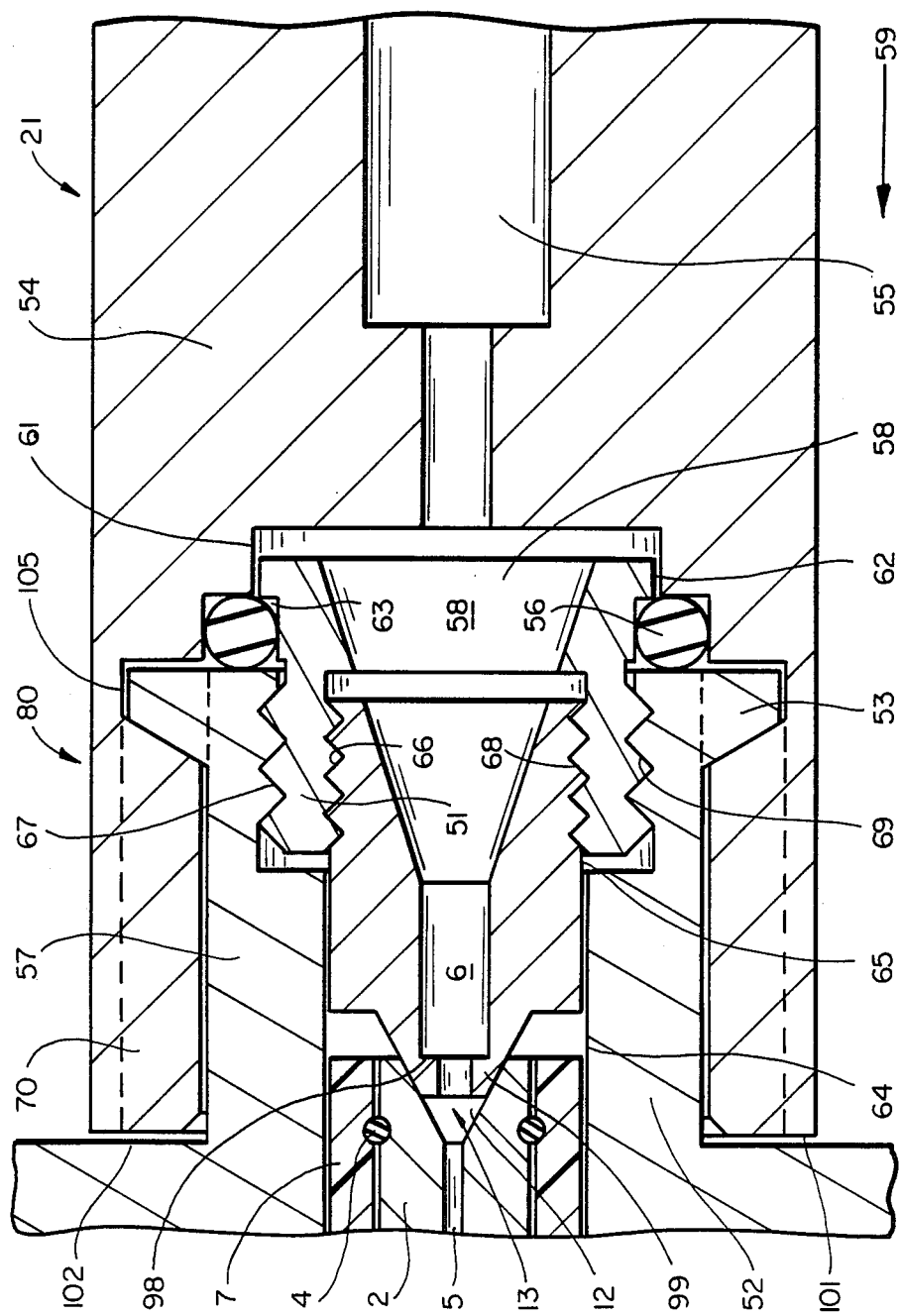
FIG_4

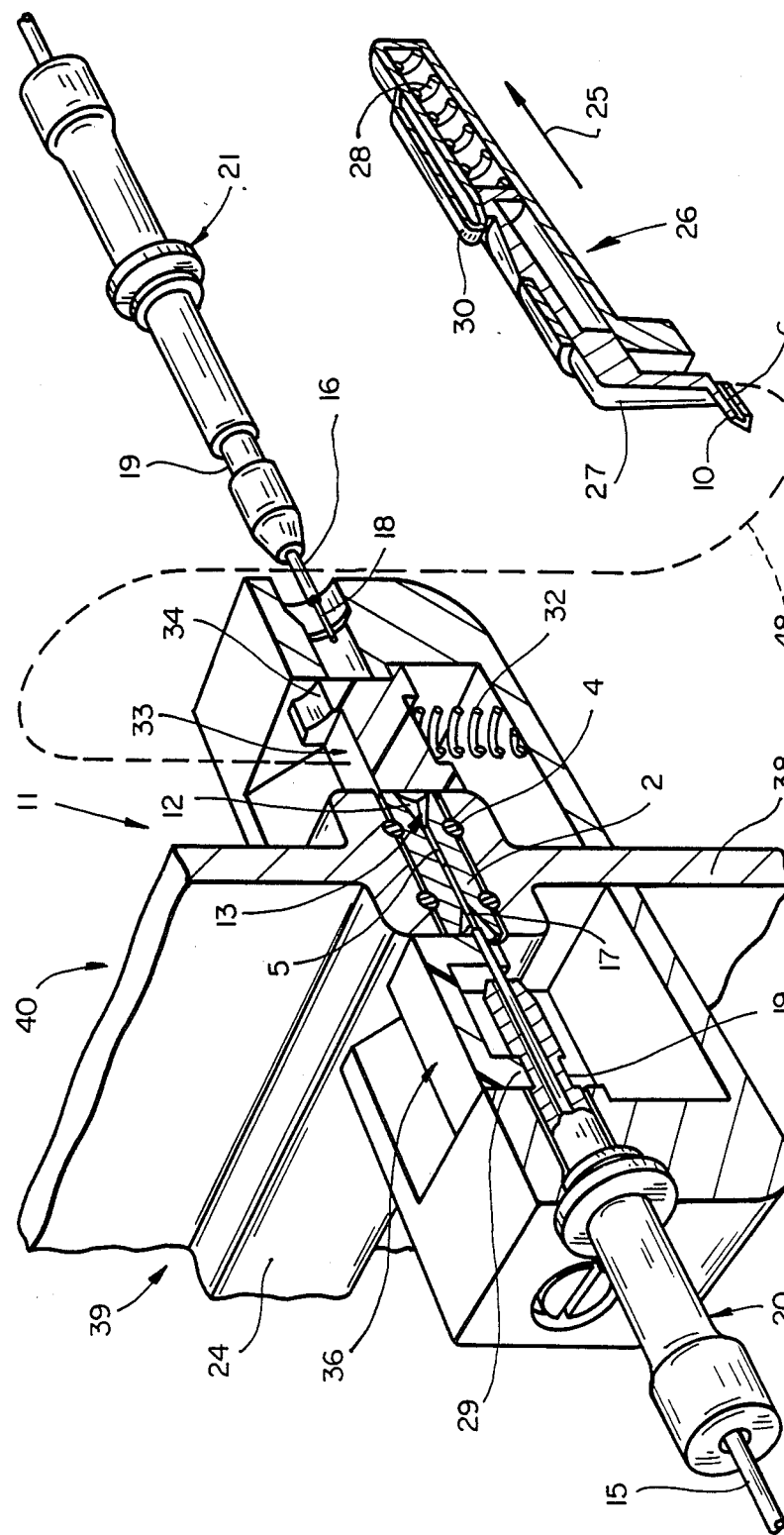
FIG_5

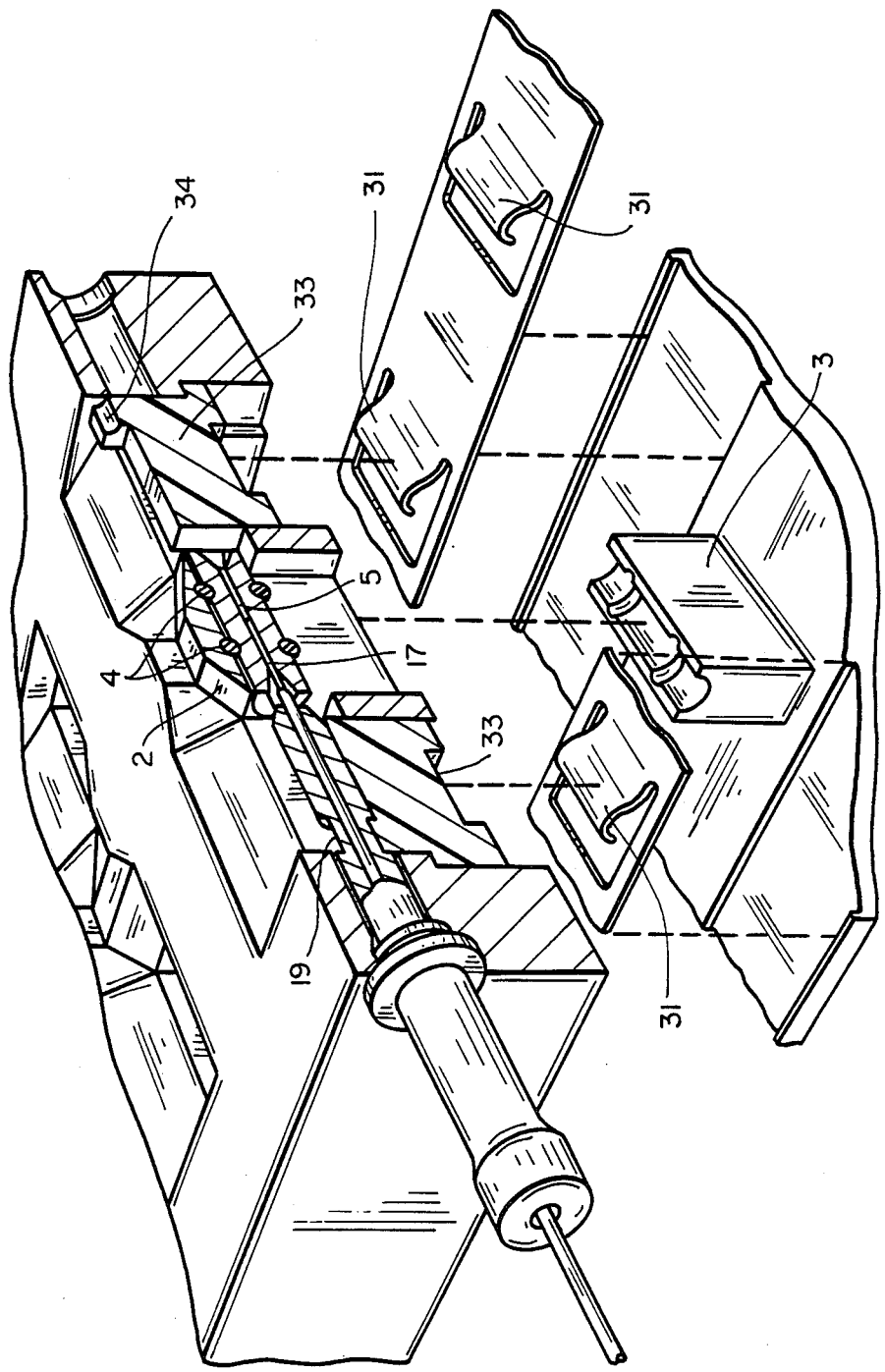
FIG_6

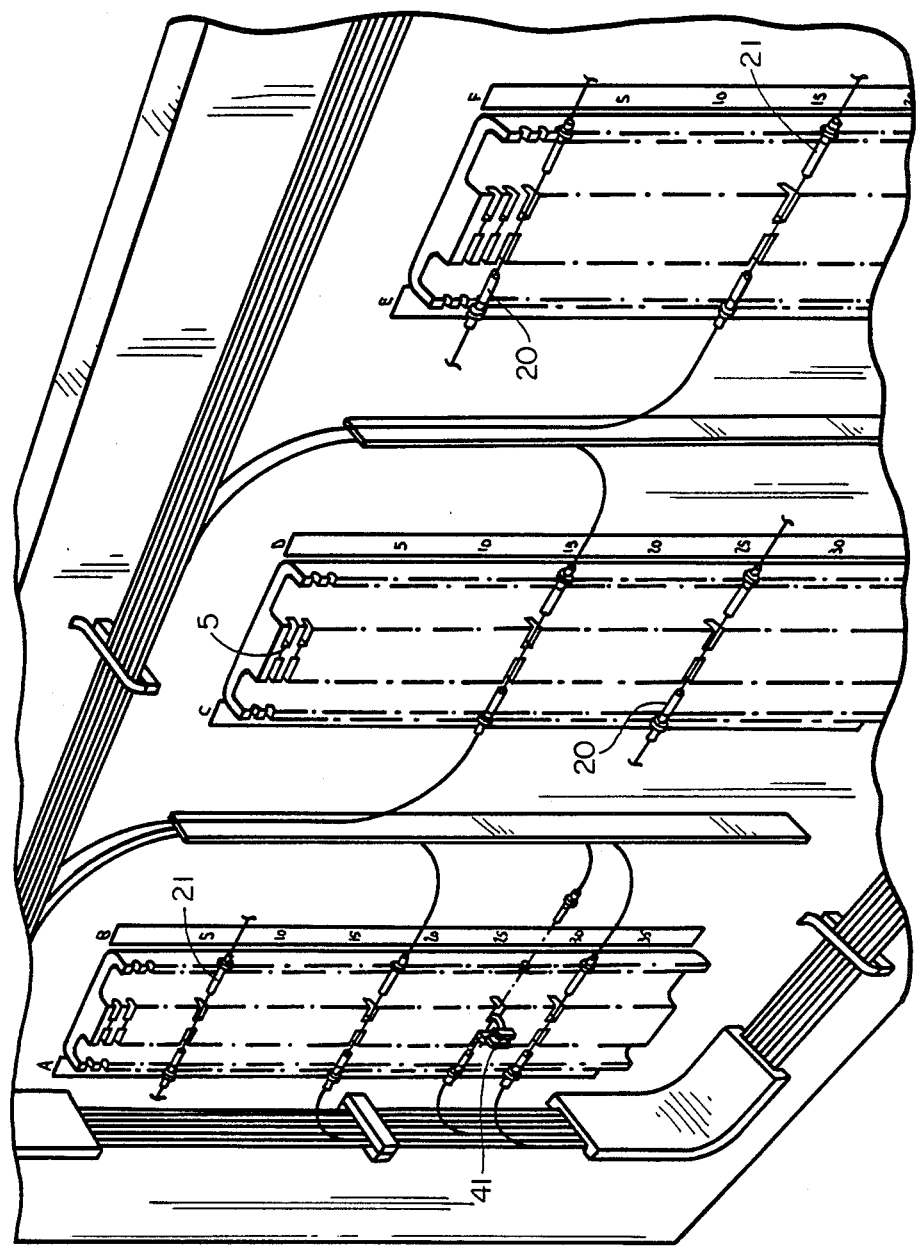
FIG_7

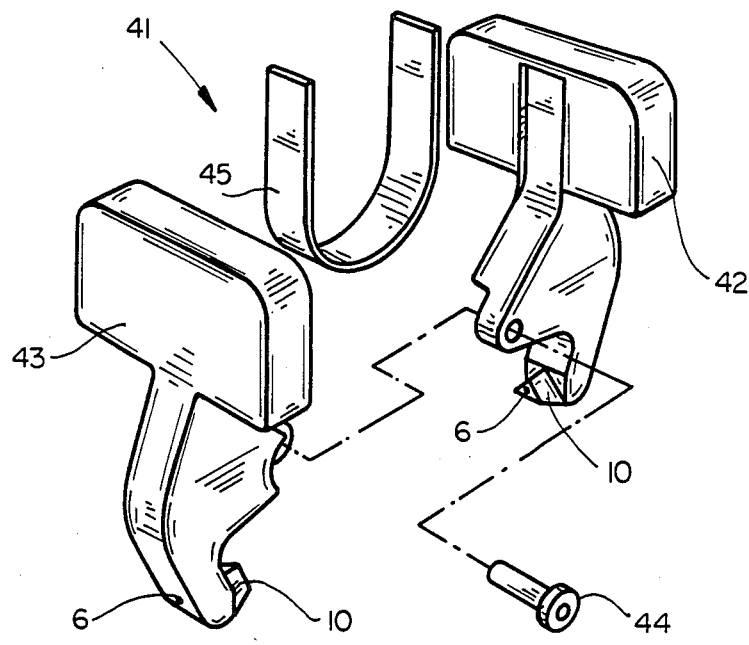
FIG_8
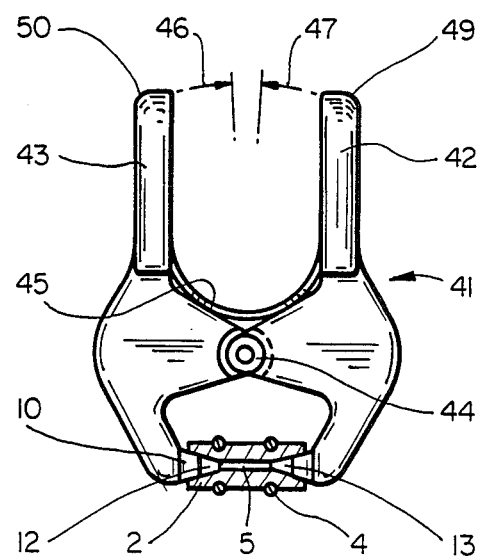
FIG_9

OPTICAL FIBER JAW CONNECTOR

BACKGROUND OF THE INVENTION

The present invention relates to an optical fiber connector which aligns fibers by aligning the outer surfaces thereof.

Recently optical fibers have extensively been deployed for information transfer purposes, optical fibers being preferred over electrical conduction means since optical fiber is capable of transmitting larger amounts of information and is immune from electromagnetic interference. Concurrently with the widespread use of optical fiber, there has been a long felt need for user friendly connectors for connecting optical fibers, and though numerous connectors have been proposed, each includes significant disadvantages.

Specifically, Mouissie, U.S. Pat. No. 4,354,731, discloses a connector which includes two floating centering jaws each of which contains an aligning V-groove therein. According to one embodiment an insertion force of the bare fibers is used to urge the jaws apart. According to a further embodiment, one or more side wedges is used to allow for a zero insertion force for the fibers and subsequent to fiber insertion the wedges are withdrawn allowing elastomeric rings to urge the jaws into aligning contact with the fibers. These constructions are disadvantageous since opposed V-grooves tend to skew fiber ends during vibration loads and hence create unpredictable connection attenuation or optical loss. More importantly, ends of the fibers are often scratched, scraped, or broken when inserted into such constructions even when wedges are employed to attempt to eliminate a fiber insertion force. Finally the use of the disclosed wedges results in a complex construction which is difficult to make and also difficult to use by a craftsman.

Logan, U.S. Pat. No. 4,253,730, at FIG. 32 discloses a connector whereby an optical fiber 274 contained within a retractable tube 284 of a fiber contact is inserted into a connector aligning aperture defined by opposing V-grooves in elastomeric members 246, 254. The contact is secured to the connector and the elastomeric members are urged into aligning contact with the fiber by applying threadable sleeve 290. The embodiment of FIGS. 37-42 is similar in that opposing elastomeric members having opposing V-grooves are compressed using compression nut 328 subsequent to connecting a fiber contact to a fiber contact connector. Again, such constructions are disadvantageous since opposed aligning V-grooves tend to skew fibers an unacceptable amount during vibration loads even when rotation thereof is prevented by using keying mechanisms. In addition, the means used for securing the contact to the connector and for compressing the elastomeric members is unduly intricate in construction and unduly craft sensitive to assemble.

SUMMARY OF THE INVENTION

It is an object of the invention to eliminate the above-noted disadvantages and to provide an optical fiber connector which is relatively simple in construction and is easy to assemble, the connector protecting fiber bends to be optically connected during assembly and providing a reliable and stable optical loss subsequent to assembly.

These and other objects are achieved by an optical fiber connector which includes:

a connector housing;

a plurality of separable jaws for aligning first and second optical fiber ends, the jaws being mateable so as to form a fiber aligning aperture longitudinally therethrough for aligning first and second optical fiber ends therein;

first means for biasing the jaws radially inward such that inner jaw surfaces defining the aligning aperture can contact and align the first and second optical fiber ends;

first means for engaging a first jaw entrance and expanding the jaws radially outward against a force of the biasing means so as to allow fiber insertion therein;

a first optical fiber contact for gripping the first optical fiber; and first means disengaging the first engaging means from the jaw entrance an amount sufficient for the first biasing means to urge the jaws into aligning contact with the first optical fiber end subsequent to inserting the first optical fiber into the aligning aperture.

DESCRIPTION OF THE DRAWINGS

FIGS. 1 and 2 illustrate a preferred jaw construction according to the invention;

FIG. 3 illustrates a preferred embodiment of a connector according to the invention;

FIG. 4 illustrates another preferred embodiment of a connector according to the invention;

FIGS. 5 and 6 illustrate two additional preferred embodiments of connectors according to the invention;

FIG. 7 illustrates a series of connectors on a multiple connect panel according to the invention; and FIGS. 8 and 9 illustrate a preferred embodiment of a tool for aiding connection of optical fiber contact with a connector according to the invention.

DESCRIPTION OF THE PREFERRED EMBODIMENTS

FIGS. 1 and 2 illustrate a preferred jaw construction for an optical fiber connector according to the invention. Referring to these figures, the jaw construction comprises preferably three jaws 2 biased radially inwardly by a pair of elastomeric ring springs 4. Each jaw 2 preferably forms a 120° arc segment of the jaw assembly, as illustrated, and an inner surface of each jaw 2 has a substantially flat surface 8 formed thereon which together form a substantially triangular first fiber aligning aperture 5.

First and second fibers 17, 18, which generally comprise a cylindrical core and cladding, preferably glass, have their outside cladding diameters aligned by the jaw flat surfaces 8 due to the inwardly biasing force of the rings 4. Since the surfaces 8 are flat, minimal rotational torque forces are induced to the optical fibers 17, 18 during vibration loads and temperature cycling since minimal sideward skew forces are exerted on the optical fibers. Accordingly a stable and reliable connection is achieved thereby. Reference numeral 22 illustrates a circular groove formed in an outer circumferential surface of the jaws 2 for accommodating and keeping the biasing rings in place.

Another important feature of the jaw construction is the provision of substantially flat surfaces 12 extending longitudinally from opposite ends of the fiber aligning aperture 5, the surfaces 12 diverging in a radial direction so as to form an inwardly contracting polygonal-shaped jaw entrance 13 for the fibers while extending them into the fiber aligning aperture 5. Means 10 complementary in shape to the jaw entrance 13 is capable of engaging the entrance 13 and expanding the jaws radially outward against the inwardly biasing force of the rings 4 when the means 10 is urged in a direction of the arrow 20 illustrated in FIG. 1. The polygon shaped complementary means 10 and entrance 13 allow a simple and efficient way of keying the jaws so as to prevent rotation thereof during vibration loads and temperature cycling so as to prevent skewing of the fibers and hence achieve a stable and predictable connection loss.

The complementary means 10 includes an aperture 6 through which an optical fiber 17 or 18 can extend so as to allow insertion of the optical fiber into the fiber aligning aperture 5 while the complementary means 10 engages surfaces 12 so as to keep the jaws in an expanded configuration. Preferably the complementary means 10 remains loosely engaged with the entrance 13 subsequent to fiber connection so as to keep the jaws keyed to prevent skewing of the fibers during vibration loads. This construction also allows the jaws to float within the connector, a further feature which results in stable, predictable connection losses. Three jaw segments are preferred since optimum radial forces are thus generated against the fibers being aligned, but additional, e.g. 4 or 5, jaws could alternatively be used though skewing of the fibers could thereby result.

Reference numerals 15 and 16 refer to first and second fiber guiding tubes within which the optical fibers 17, 18 are contained, the tubes extending into the connector just short of the fiber aligning aperture 5. The protective tubes allow bare glass fibers to be safely inserted into the connector, as more fully described below.

FIG. 3 illustrates a preferred embodiment of a connector 90 of the invention. Referring to this figure, a front portion of an optical fiber 18 is completely contained within protective tube 16 which is part of optical fiber contact 81. A compression nut 78 at a rear of the contact 81 is utilized to grip a jacket of the optical fiber, and preferably a strain relief member(s) thereof. A spring 73 is utilized to normally urge the protective tube 16 in a forward direction, e.g. towards the connector 90. A boss 86 of the tube 16 is engageable with a shoulder 87 in an interior of the contact which limits forward movement of the tube 16.

An end 91 of the optical fiber 18 is recessed a predetermined amount from an end 93 of the tube 16 by a tool (not shown) prior to tightening the compression nut and thereby fixing the relative positions of the ends 91, 93 when the tube 16 is in its fully extended forward state, as illustrated. Therefore, during fiber insertion, the fiber is fully protected by the tube up to the point when the tube end 93 engages stopping surface or shoulder 60 of pyramid collet 82 within the connector 90.

The connector 90 includes a contact locking member 74 and a connector body 82. The locking member 74 has at least two grooves 96 on an outer surface thereof which allow at least two contact extensions to slide longitudinally thereover such that a front end 94 of the contact can engage a shoulder 84 of the connector 90, a front portion 95 of the connector having longitudinal grooves (not shown) on an outer circumference thereof for accommodating the extensions 76. Circumferential grooves 97 are formed in the contact extentions 76 which allow the locking member 74 to be rotated subsequent to full contact insertion for locking the contact 81 to the connector 90. The connector body includes a pyramid collet 88 on a front thereof which engages jaw entrance surfaces 12 and accordingly opens and closes the jaws, as previously explained. A spring 72 urges the body 82 in a direction away from the jaw entrance surfaces 12, and movement of the body 82 is limited by shoulder 89 of the locking member 74.

According to this construction, when the optical fiber contact 81 is inserted into the connector 90, the front end 93 of the tube 16 engages the shoulder 60 within the collet 82 prior to a front end 94 of the contact 81 engaging the shoulder 84, a separation between the shoulder 84 and the front end 94 being just slightly larger than a distance that the front end 91 of the fiber 18 is recessed within the protective tube 16. Accordingly, when the end 94 engages the shoulder 84, the fiber end 91 is extended to a position just past a center of the connector alignment groove 5 due to compression of tube spring 73. This construction ensures that fibers to be connected are maintained slightly bowed and their ends in abutment which reduces optical losses. After full contact insertion, the member 74 is rotated so as to engage and extend within the extension groove 97 so as to lock the contact 81 to the connector 90. By appropriately choosing a pitch of engaging threads 85, it is readily apparent that the rotation of the locking member 74 will also cause the member 74 to move in a direction away from the jaw entrance surfaces 12 a predetermined small distance and hence allow the spring 72 to urge the pyramid collet 82 out of engagement of the jaw entrance surfaces 12 enough so as to allow the jaws 2 to radially compress and engage and align the optical fibers within the alignment aperture 5. Hence, one movement of the locking member 74 locks the contact 81 to the connector 90 and also releases the jaw segments 2 to align and connect the fiber ends being connected. Hence, a craft friendly connection is achieved.

FIG. 4 illustrates another preferred embodiment of the invention. Referring to this figure, pyramid collet 99 is integral with a front section of a body 57 having external threads 66 which engage internal threads 68 of a bolt 51. The bolt 51 has external threads 67 which engage with internal threads 69 of stationary member 52. Reference numeral 56 refers to a sealing ring contained within groove 63, this groove being optional. A fiber contact 21 again is used to terminate an optical fiber (as shown in FIG. 4) by using a protective tube as in the embodiment of FIG. 3, with forward movement of the tube being halted by shoulder 98 formed on a interior surface of the collet 99. At this point, a front 101 of the contact 21 is separated from a front 102 of connector flange 103 by an amount just slightly greater than a distance necessary for the fiber end to extend just past a center of the alignment groove 5 when the fronts 101, 102 engage. The fiber end is extended relative to the tube by compression of a tube spring, as explained in the figure 3 embodiment.

The locking mechanism of FIG. 4 differs from that of FIG. 3. In the FIG. 4 construction, a groove 105 is formed on an inner circumferencial surface of contact housing 54 a predetermined distance, e.g. 60°, 120°, or 180°, and an outer housing 52 of the connector 80 is grooved logintudinally so as to form shoulders 53 which extend partially around the housing circumference. With this construction, subsequent to mating the contact 21 with the connector 80 by sliding the contact housing flange 70 longitudinally over the connector housing longitudinal groove, the contact is locked to the connector by rotating the contact 21 circumferencially relative to the connector 80 so that the connector shoulder 53 locks within the contact groove 105.

This locking procedure also releases the collet 99 from the jaw entrance 13 an amount sufficient to allow the jaws 2 to clamp onto and align the fiber ends being connected. More specifically, since housing inner surface 61 is keyed to bolt outer surface 62 by any convenient means, e.g. hexigonal mating surfaces, the bolt 51 rotates with the contact 21 during locking. However, since the collet body 57 is likewise keyed to the connector housing 52 by similar keyed surfaces 65, 64 respectively, the collet body remains rotationally stationary with the connector housing 52. Accordingly, it can be appreciated that when the locking member 54 is rotated so as to lock the contact housing 21 to the connector 80, the nut 51 is also rotated relative to both the body 57 and the stationary member 52. Accordingly, by appropriately choosing a pitch and attitude of engaged threads 67, 69 and engaged threads 66, 68, the body 57 can be urged to move in a direction opposite that of arrow 59 so as to cause the pyramid collet 10 to disengage from jaw entrance surfaces 12 so as to allow the rings 4 to urge the jaw segments 2 into radial compression against the optical fiber being terminated and yet allow the collet 10 to remain rotationally keyed to the jaws.

FIG. 5 illustrates another preferred embodiment of the invention, this figure showing a patch panel connection having a back 39 and a front 40. Referring to this figure, a connector 11 includes the jaw segments 2 and the biasing ring springs 4 previously described. A first optical fiber 17 is illustrated as already installed within the connector 11. The optical fiber 17 is retained within a protective tube 15 which is connected to a first optical fiber contact 20. The contact 20 is retained in place by a back clamp 36 which has a flange 29 which engages a contact groove 19.

A second optical fiber contact 21, which includes the optical fiber 18 within an optical fiber protective tube 16, is connected to the connector 11 using tool 26. The tool 26 includes an extension 27 which includes on a front end thereof the complementary means or collet 10 which in the embodiment illustrated again comprises a pyramid shaped member. The extension 27 is moveable in a direction of arrow 25 by utilizing hand moveable member 30, and the spring 28 moves the extension 27 in a direction opposite the arrow 25 when the member 30 is released.

To connect the optical fiber 18 to the connector 11, the tool 26 is inserted along a path indicated by dotted line 48 so as to urge locking clamp 33 downward against a force of spring 32. When the collet 10 is aligned with the jaw entrance 13, the spring 28 causes the collet 10 to urge the jaw segments 2 radially outward against the biasing force of rings 4. Thereafter, the optical fiber contact 21 is moved in a direction opposite the arrow 25 so as to insert the optical fiber 18 therewithin. Upon full insertion of the contact 21, an end of the optical fiber 18 abuts against an end of the optical fiber 17, and the tool is removed from the connector 11 which allows the locking clamp 33 to move upward in the drawing whereby locking mechanism 34 engages the optical fiber contact groove 19 so as to lock the contact housing 21 in place. Of course upon removal of the tool 26, the optical fiber 18 is clamped and aligned with the optical fiber 17 due to the biasing force generated by the rings 4 against the jaws 2.

FIG. 6 illustrates an alternative embodiment of the invention whereby locking clamps 33 are urged into engagement with contact housing grooves 19 via a plurality of inline springs 31. The embodiment of FIG. 6 is most useful in an exposed connector panel requiring a plurality of adjacent connections, as illustrated in FIG. 7.

A tool 41 most useful for connecting optical fibers in a panel such as that illustrated in FIG. 7 is illustrated in FIGS. 6 and 7. The tool includes first and second members 42, 43 which have pyramid collets 10 located on adjacent bottom sections thereof. The collets 10 are urged towards one another and hence into jaw entrances 13 by a force of spring 45. The members 42, 43 are held together via a bolt 44, as best illustrated in FIG. 6.

To connect optical fibers in a panel such as that illustrated in figure 5, tool handles 49, 50 are urged in the direction of arrows 46, 47 so that the collets 10 can be aligned with the jaw entrances 13, and then the handles 49, 50 are released which allows collets 10 to expand the jaw segments 2. Thereafter, first and second optical fibers 17, 18 are inserted into the contact through aperture 6 which extend through the collets 10, and subsequent to fiber insertion the tool is removed so as to allow the rings 4 to urge the jaw segments 2 into engagement with the optical fibers and hence align the claddings.

Though the invention has been described by reference to certain preferred embodiments thereof, it should be appreciated that the invention is not to be limited thereby and is to be limited only by the appended claims.

What is claimed is:

1. An apparatus for connecting first and second optical fibers, comprising:
   a plurality of separable jaws for aligning first and second optical fiber ends, the jaws being mateable so as to form a fiber aligning aperture longitudinally therethrough for aligning first and second optical fiber ends therein; the jaws having keyed surfaces extending longitudinally from a first end of the aligning aperture and which diverge in a radial direction so as to form an inwardly contracting keyed first jaw entrance for the first end of the aligning aperture;
   means for biasing the jaws radially inward such that inner jaw surfaces defining the aligning aperture can contact and align the first and second optical fiber ends;
   first means complementary in shape to the keyed first jaw entrance for preventing rotation of the jaws and for engaging the first jaw entrance and for expanding the jaws radially outward against a force of the biasing means; and first means for disengaging the complementary means from the first jaw entrance subsequent to inserting the first optical fiber end into the aligning aperture an amount sufficient for the biasing means to urge the jaws into aligning contact with the optical fiber ends.

2. The apparatus of claim 1, the first complementary means having a second aperture therein through which the first optical fiber end can be inserted therethrough and into the aligning aperture while the first complementary means maintains the jaws in an expanded attitude.

3. The apparatus of claim 1, the plurality of jaws consisting of three, the inner jaw surfaces being flat so as to define a triangular-shaped aligning aperture.

4. The apparatus of claim 1, further comprising a jaw housing, the disengaging means securing a fiber contact supporting the first optical fiber to the jaw housing as the complementary means is being disengaged.

5. The apparatus of claim 3, the first jaw entrance and first complementary means having a pyramid shape.

6. The apparatus of claim 3, the jaws having keyed surfaces extending longitudinally from a second end of the aligning aperture and which diverge in the radial direction so as to form an inwardly contracting keyed second jaw entrance for the second end of the aligning aperture, and further comprising second means complementary in shape to the keyed second jaw entrance for preventing rotation of the jaws and for engaging the second jaw entrance and for expanding the jaws radially outward against a force of the biasing means.

7. The apparatus of claim 1, the first disengaging means maintaining the first jaw entrance and the first complementary means keyed so as to prevent relative rotation therebetween when the jaws are in aligning contact with the first optical fiber end.

8. The apparatus of claim 1, the jaws being made of a hard ceramic material.

9. The apparatus of claim 6, the first and second jaw entrances and the first and second complementary means each having a pyramid shape, the first disengaging means maintaining the first jaw entrance and the first complementary means keyed so as to prevent relative rotation therebetween when the jaws are in aligning contact with the first optical fiber end, the second disengaging means maintaining the second jaw entrance and the second complementary means keyed so as to prevent relative rotation therebetween when the jaws are in aligning contact with the second optical fiber end.

10. The apparatus of claim 1, the disengaging means comprising a bolt rotationally keyed to a fiber contact housing to which is secured the first optical fiber, the bolt being threadably engaged with a body of the first complementary means, the body being rotationally keyed to an outer housing surrounding the jaws.

11. An optical fiber connector for connecting first and second optical fibers, comprising:
 a connector housing;
 a plurality of separable jaws for aligning first and second optical fiber ends, the jaws being mateable so as to form a fiber aligning aperture longitudinally therethrough for aligning first and second optical fiber ends therein;
 first means for biasing the jaws radially inward such that inner jaw surfaces defining the aligning aperture can contact and align the first and second optical fiber ends;
 first means for engaging a first jaw entrance and expanding the jaws radially outward against a force of the biasing means so as to allow fiber insertion therein;
 a first optical fiber contact for gripping the first optical fiber;
 first means for disengaging the first engaging means from the jaw entrance an amount sufficient for the first biasing means to urge the jaws into aligning contact with the first optical fiber end subsequent to inserting the first optical fiber into the aligning aperture.

12. The connector of claim 11, the first disengaging means securing a housing of the first contact to the connector housing as the engaging means is being disengaged.

13. The connector of claim 11, the first contact including a retractable fiber protective tube, the first optical fiber being gripped by the contact so as to be recessed a predetermined distance from an end of the protective tube when unretracted, and further comprising means for limiting forward movement of the protective tube outside the aligning aperture as the tube is inserted into the connector housing such that when a stop of the first contact engages a stop of the connector housing the end of the first optical fiber is preloaded against the end of the second optical fiber within the aligning aperture.

14. The connector of claim 13, further comprising means for securing a housing of tee first contact to the connector housing, the securing means activating the disengaging means so that the jaws are urged into aligning contact with the first optical fiber end.

15. The connector of claim 14, further comprising a second jaw entrance, a second engaging means, a second optical fiber contact, and a second disengaging means each having a structure substantially the same as its first counterparts.

16. The connector of claim 13, the forward limiting means being formed on an interior surface of the engaging means.

17. The connector of claim 11, the jaws having substantially flat surfaces extending longitudinally from a first end of the aligning aperture and which diverge in a radial direction so as to form an inwardly contracting keyed jaw entrance for the first end of the aligning aperture, the engaging means being keyed to the jaw flat surfaces.

18. The connector of claim 11, the engaging means having a second aperture therein through which the first optical fiber end can be inserted therethrough and into the aligning aperture while the engaging means maintains the jaws in an expanded attitude.

19. The connector of claim 11, the jaws consisting of three and together defining a triangular shaped aligning aperture.

* * * * *

UNITED STATES PATENT AND TRADEMARK OFFICE
CERTIFICATE OF CORRECTION

PATENT NO. : 4,848,870
DATED : July 18, 1989
INVENTOR(S) : Wisecarver et al.

It is certified that error appears in the above-indentified patent and that said Letters Patent is hereby corrected as shown below:

ON THE TITLE PAGE

Reference Cited [56], insert --4,279,467, 7/81, Borsuk et al.......350/96.21--.

Reference Cited [56], insert --4,319,802, 3/82, Bowes......350/96.20--.

Reference Cited [56], insert --4,339,172, 7/82, Leather......350/96.21--.

Column 8, Line 30, replace "tee" by --the--.

Signed and Sealed this

Twenty-fifth Day of October, 1994

Attest:

BRUCE LEHMAN

Attesting Officer                Commissioner of Patents and Trademarks